W. L. BLISS.
BELT AND BELT FASTENER.
APPLICATION FILED SEPT. 16, 1912.
1,157,499.
Patented Oct. 19, 1915.
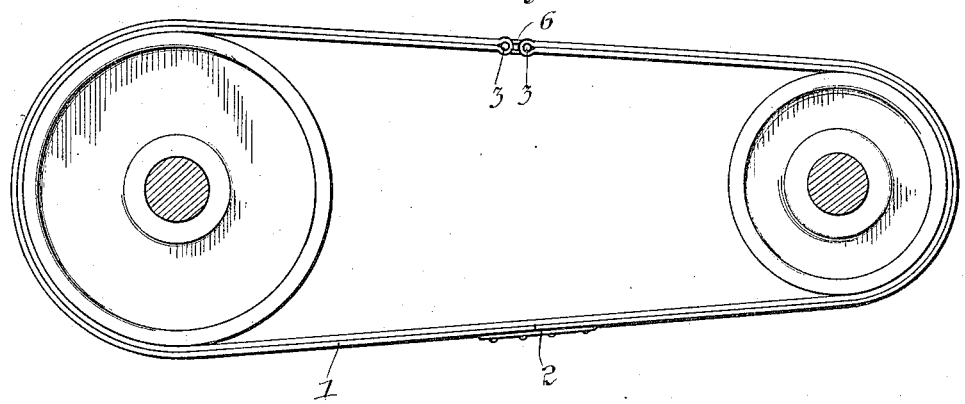
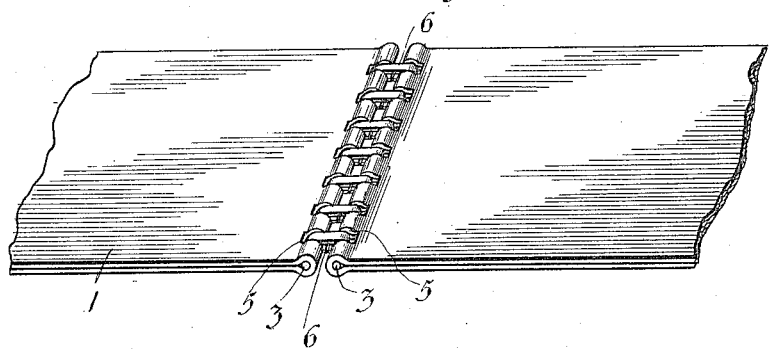
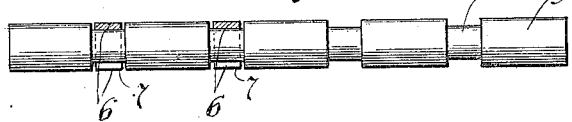
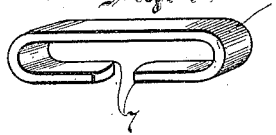
Witnesses
Robert H. Weir
Arthur B. Framke.
Inventor
William L. Bliss
by Edwin B. H. Power, Jr.
Atty

UNITED STATES PATENT OFFICE.

WILLIAM L. BLISS, OF NIAGARA FALLS, NEW YORK, ASSIGNOR, BY MESNE ASSIGNMENTS, TO THE U. S. LIGHT AND HEAT CORPORATION, OF NIAGARA FALLS, NEW YORK, A CORPORATION OF NEW YORK.

BELT AND BELT-FASTENER.

1,157,499.           Specification of Letters Patent.       Patented Oct. 19, 1915.

Application filed September 16, 1912. Serial No. 720,531.

*To all whom it may concern:*

Be it known that I, WILLIAM L. BLISS, a citizen of the United States, residing at Niagara Falls, in the county of Niagara and State of New York, have invented new and useful Improvements in Belts and Belt-Fasteners, of which the following is a full, clear, concise, and exact description, reference being had to the accompanying drawing, forming a part of this specification.

My invention relates to belts and belt fasteners.

It has among its objects to provide a belt of improved wearing qualities.

A further object of my invention is to provide improved means for connecting the ends of the belt which may be very readily adjusted and which at the same time are flexible so that they may readily pass over the belt pulley.

Other objects and advantages of my improvement will hereinafter appear.

In order that my invention may be fully and clearly disclosed, I have illustrated one embodiment of the same in the accompanying drawings.

Figure 1 is a side elevation of the belt in position on a pair of pulleys. Fig. 2 is a perspective view of the belt and the belt fastener. Fig. 3 is a detail view of one of the fastening parts. Fig. 4 is a detail view of another of the fastening parts.

The belt 1 shown herein is formed of a single strip of material united at its ends by a suitable riveted plate 2 and then doubled and again united at its ends by a fastener hereinafter described.

The fastener comprises a plurality of pins 3 which are preferably substantially cylindrical in shape and each provided with a plurality of annular grooves 4 of reduced cross-section at points between their ends. These pins are inserted through the bights of the folded ends of the belt, so that they are snugly held against the rounded ends of the same. Substantially rectangular cut-out portions 5 are provided in the ends of the belt which register with the annular grooves 4, as shown in Fig. 2. Hooks 6 (Fig. 4) preferably formed of a flat sheet of metal and having flexible ends 7, are then inserted in the cutaway portions 5 over the annular grooves 4, and their ends 7 are bent flat, as shown in Fig. 4.

The belt shown herein is under no strain near a cut edge and therefore there is no tendency for the belt to fray out. The belt is made of a plurality of thicknesses of material and so constructed that the strain is evenly distributed in such a manner as to improve its wearing qualities. Further, the fastening means may be very readily and quickly inserted or removed when desired, and are of a simple, strong and inexpensive construction.

While I have specifically described this embodiment of my invention, I do not limit myself to the same since the form shown is susceptible of modification.

What I claim as new and desire to secure by Letters Patent of the United States is:

1. In combination with a belt having folded ends there being openings through said ends at the folds, pins extending through said openings, and hooks extending through said openings in the ends of said belt engaging said pins and holding said ends together.

2. In combination with a belt having folded ends there being openings through said ends at the folds, pins extending through said openings, said pins having annular recesses between their ends registering with cutaway portions in the ends of said belt, and hooks extending through the openings in said folds engaging said pins and holding said ends together.

In witness whereof, I have hereunto subscribed my name in the presence of two witnesses.

WILLIAM L. BLISS.

Witnesses:
   E. P. HARNIG,
   JAMES L. COUGHLIN.

Copies of this patent may be obtained for five cents each, by addressing the "Commissioner of Patents, Washington, D. C."